United States Patent [19]

Murray, Jr.

[11] 4,367,594
[45] Jan. 11, 1983

[54] ALIGNMENT SYSTEM

[76] Inventor: Malcolm G. Murray, Jr., 220 E. Texas Ave., Baytown, Tex. 77520

[21] Appl. No.: 111,779

[22] Filed: Jan. 14, 1980

[51] Int. Cl.³ .............................................. G01B 3/30
[52] U.S. Cl. .............................. 33/181 R; 33/172 R; 33/412; 248/123.1
[58] Field of Search ................. 33/181 R, 182, 180 R, 33/181 AT, 180 B, 412, 180 AT, 168 R, 125 R, 172 R; 248/123.1

[56] References Cited

U.S. PATENT DOCUMENTS

| | | |
|---|---|---|
| 2,656,607 | 10/1953 | Harding . |
| 3,176,403 | 4/1965 | Meyer ............................ 33/125 R X |
| 3,525,158 | 8/1970 | Torlay ............................... 33/412 X |
| 3,631,604 | 1/1972 | Schenavar . |
| 3,664,029 | 5/1972 | Glucoft et al. |
| 3,733,706 | 5/1973 | Blohm . |
| 3,789,507 | 2/1974 | Murray, Jr. |
| 3,849,857 | 11/1974 | Murray, Jr. |

OTHER PUBLICATIONS

Jackson, The Oil and Gas Journal, Mar. 11, 1974, pp. 124–130.
Murray, Jr. Reprint from Hydrocarbon Processing, Oct. 1974.
Mung, J. Reprint from Hydrocarbon, Jan. 1979.

*Primary Examiner*—William D. Martin, Jr.
*Attorney, Agent, or Firm*—Kenneth H. Johnson

[57] ABSTRACT

An alignment apparatus system for aligning coupled shafts, for example between a motor and a driven device, which comprises an alignment fixture, alone and in combination with one or more of an adjustable fixture post or a sag remover. Basically, the alignment fixture comprises an extendable radial arm and a laterally extending arm, which is axial to shaft being aligned, on which a dial indicator is mounted distal to the radial arm. The alignment fixture is mounted to one shaft and the dial indicator contacts the other shaft or a rigid coupling hub mounted thereon and the misalignment is determined and corrected in the usual manner. In some instances, the dial indicator cannot contact the second shaft and the fixture post which extends radially from the second shaft provides the contact point for the dial indicator. In some instances, the laterally extending arm of the fixture is so long that it sags excessively when the vertical alignment is made. To compensate for this sag, the sag remover is connected to the arm and by a counterweight removes the sag which has the principal advantage of retaining measuring capacity of the dial indicator.

26 Claims, 14 Drawing Figures

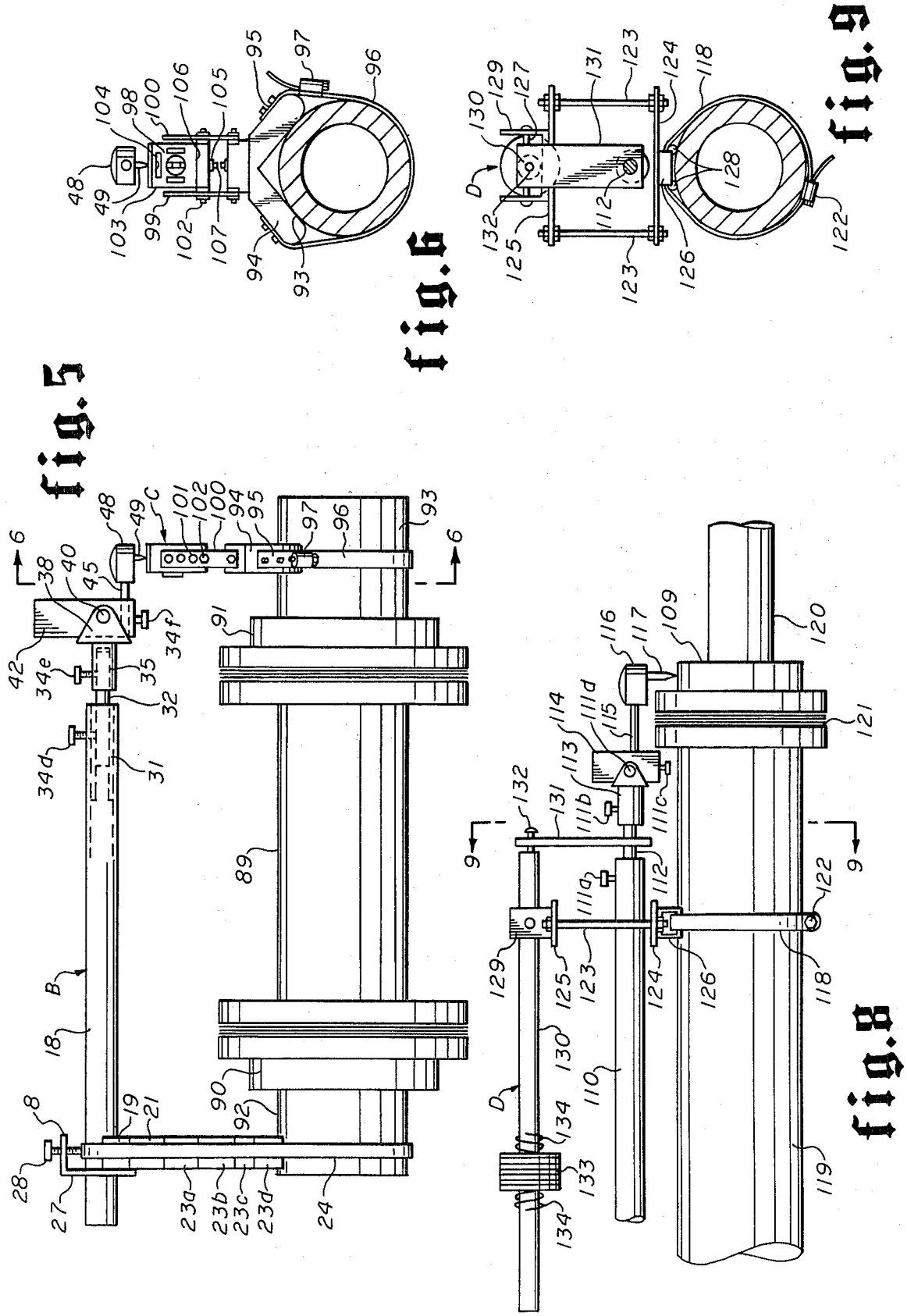

ALIGNMENT SYSTEM

BACKGROUND OF THE INVENTION

1. Field of the Invention

The present invention relates to an apparatus system for alignment of machine shafts; in particular it applies to alignment of horizontal coupled machine shafts.

Such shafts, when in perfect alignment, will have their extended center lines coincide along the same straight line (or curve in the case of long slender shafts) in space. Perfect alignment seldom occurs, but good alignment should be attained for any machine needing continuous, reliable operation. Poor alignment can cause excessive vibration and premature failure of bearings, seals, couplings, rotating elements, stationary machine structure and connected piping and duct work.

The apparatus of the present invention is specifically related to "cold" alignment, although thermal growth or "hot" alignment may be accounted for in some measure by calculation, provided that the information on the thermal characteristics of the aligned components is known. In any event, "hot" alignment is not the subject matter of the present invention and other specific apparatus will best serve that purpose.

The alignment task can be divided into three main phases: (1) measurement (the subject matter of the present invention), (2) calculation (the present inventor's U.S. Pat. No. 3,789,507) and (3) movement (the present inventor's U.S. Pat. No. 3,849,857). It is readily apparent that the latter two steps depend on the accuracy of the measurement.

The two most commonly employed methods of determining misalignment are the "face and rim" method and the "reverse indicator" method, both of which normally employ dial indicators for measurement. The present apparatus will work equally well for both methods and is especially useful for the reverse indicator method which is the most accurate in most circumstances.

PRIOR ART

Generally, a rough alignment of the driver and driven elements is obtained, using steel rulers or straightedges, feeler gages and the like to place the elements within the range of the dial indicator normally used to measure misalignment. An accuracy of under 1/32 inch is adequate for a rough alignment. Years ago, when machines operated at slow speeds and were extensively spared, such rough accuracy may have been adequate; however, now alignment within a few thousandths of an inch is required.

Dial indicators are widely used for alignment. There are two types, the continuous reading type and the balanced type; the latter is used herein for describing the present invention. The balanced type of indicator has a dial that reads in both directions from zero with the face graduation being in thousandths of an inch. The dial indicator is operated by a plunger that moves the hand on the face. Inward movement of the plunger moves the hand clockwise and outward movement moves the hand counter clockwise. The face of the dial is rotatable to zero in any position.

The dial indicator is affixed solidly to one shaft or coupling hub with the plunger contacting the other shaft or coupling hub. The indicator is usually attached to an indicator bar that spans the gap between the two shafts (note there may be an indicator bar from both shafts whereby the plunger contacts an indicator bar rather than the opposite shaft).

The indicator bar(s) are employed to take measurements on constant but unknown radii from shaft centerlines, such that the distance between the centerlines can be determined at any desired transverse plane along shaft axes.

Generally in the reverse-indicator method, the indicator is zeroed at the top, rotated 180° to the bottom and the "parallel" misalignment for that measurement plane determined therefrom. A similar reading is carried out horizontally (at 90°), and the whole procedure repeated for a second measurement plane along the shaft axis. From these measurements, the "angular" measurement, or coupling hub face gap difference, may be derived. Alternatively, for the face-and-rim method, only a single measurement plane is used, and the angular misalignment readings are taken directly. One problem with existing apparatus for measuring alignment is sag, which is not a concern in horizontal measurements but may be significant on the vertical measurements of horizontal shafts, depending on such things as spacer length, indicator apparatus and the like.

U.S. Pat. No.'s 3,525,158 to Torlay and 3,733,706 to Blohm show two related alignment apparatus which employ a block, a chain or strap through the block to attach it to one of the shafts to be aligned and a rod movably mounted in said block on which an indicator gauge is mounted.

Among the advantages of the present invention are, a more truly universal apparatus which will fit a greater variety of machine shafts—coupling configurations; low sag over long spans; low hysteresis; easily clamped on a shaft, coupling hub or rim; modular radial attachment, which allows considerable variation in the radial length of the apparatus; no upper limit on the diameter of the shaft to which the apparatus may be mounted; the indicator gauges may be positioned by pure linear adjustment; and the system adapts to overcome obstructions along the shaft; and eliminate sag.

SUMMARY OF THE INVENTION

The present invention may be briefly described as an alignment apparatus system comprising an alignment fixture (sometimes called brackets, jigs or holders) which may be clamped to machine shafts or coupling hubs alone or in combination with one or more of (1) an adjustable fixture post and (2) a sag remover.

A central element of the present system is the alignment fixture which comprises a modular radial arm adapted to seat onto a shaft to be aligned, said radial arm being extendable by modular units to obtain clearance of said radial arm beyond obstructions along said shaft to be aligned, an arm extending laterally from said radial arm and axially in regard to said shaft to be aligned, a metal strap associated with said radial arm (in some embodiments said metal strap extends about said radial arm and said shaft) for attaching said radial arm to said shaft (in other embodiments the metal strap or straps may attach two or more elements of the system together on a shaft) to be aligned and means located along said metal strap to fasten and adjust said metal strap, a holder connected to said laterally extending arm, distal to said radial arm and having a channel therein, and a block for positioning a dial indicator adjustably mounted in said channel. The laterally extending arm extends axially from the radial arm along an axis parallel (or substantially parallel) to the shaft to be aligned. Hence the laterally extending arm is substantially perpendicular to the radial arm when the fixture is assembled for use or in use.

Another element of the present system is the adjustable fixture post comprising a first block adapted to seat on a shaft to be aligned and extend radially therefrom, a pair of substantially parallel members mounted to said block and extending therefrom, a second block repositionably mounted between said substantially parallel members for positioning said second block at various distances from said first block whereby various radial extensions are obtained to provide a surface corresponding to a point on a shaft to be aligned and means to affix said first block to a shaft. Preferably means are provided on said second block to sight level and normalize said fixture post when it is mounted on a shaft to be aligned, such that indicator contact surfaces are parallel and/or perpendicular to said shaft, as appropriate.

In the system, the fixture post is used to represent the second shaft to be aligned when the alignment fixture represents the first shaft to be aligned, where obstructions along the shaft such as housings cause the alignment fixture to be radially displaced some distance from the shaft, such that the indicator gauge can not contact a portion of the shaft. The plunger of the dial indicator contacts the second block of the fixture post representative of an extended radius from the center of the second shaft.

Another element of the present system is a sag remover, which comprises a base, a fulcrum affixed to said base, an arm pivotally mounted through said fulcrum, means for attaching one end of said arm to the laterally extending arm of an alignment fixture and weighting means slidably mounted on said arm past said fulcrum on the end of the rod opposite to said means for attaching to said laterally extending arm.

The advantage of the sag remover is that the full range of the indicator gauge is preserved to be employed for determining misalignment. The indicator gauges operate by a plunger which moves in or out thereby indicating the amount (or double the amount in the case of rim readings) of misalignment which is read from a dial. Normally the sag may be compensated for by procedures known in the art, by determining sag and accounting for it in the calculations. The zero point on the indicator is usually adjustable thus even if there is sag, the measurements are still taken from the zero point. The problem caused by sag of the laterally extending arm in the indicator, however, becomes acute when the shaft is long and the alignment fixture must cover the long span. The sag of course, becomes greater because of the greater flexibility of the long arm of the fixture and greater weight thereof, thus the plunger may be pushed far into the indicator in the case of an upper fixture (or extended in the case of a lower fixture). Thus, the actual range of the plunger in the upward direction may be very substantially reduced, that is the plunger may be pushed almost into the indicator housing because of the sag and if the misalignment is in that direction, there is little capacity remaining to measure it. Longer range indicators are available, but their added weight and bulk are disadvantageous.

The sag remover allows the sag to be removed and the plunger to be extended to about its mid point so that the full capacity of the gauge to measure misalignment is retained even on very long shafts.

The term "shaft" as used herein, includes coupling hubs, hub flanges, and the shafts, per se. When the term "metal strap" is used, it is understood to be a continuous metal strap, a discontinuous strap, there being two or more straps, either connected together directly or by intermediate components and, a metal band or belt of the same character.

The invention will be further understood from the following discussion and description of the drawings.

BRIEF DESCRIPTION OF THE DRAWINGS

FIG. 5 is an elevational side view of the combination of a fixture and an adjustable fixture post.

FIG. 6 is an end view along line 6—6 of FIG. 5 of the adjustable fixture post.

FIG. 8 is a partial side elevational view of a fixture and an alternate embodiment of a sag remover in combination therewith.

FIG. 9 is an end view taken along line 9—9 of FIG. 8.

DETAILED DESCRIPTION OF THE INVENTION AND PREFERRED EMBODIMENTS

Figure 1:
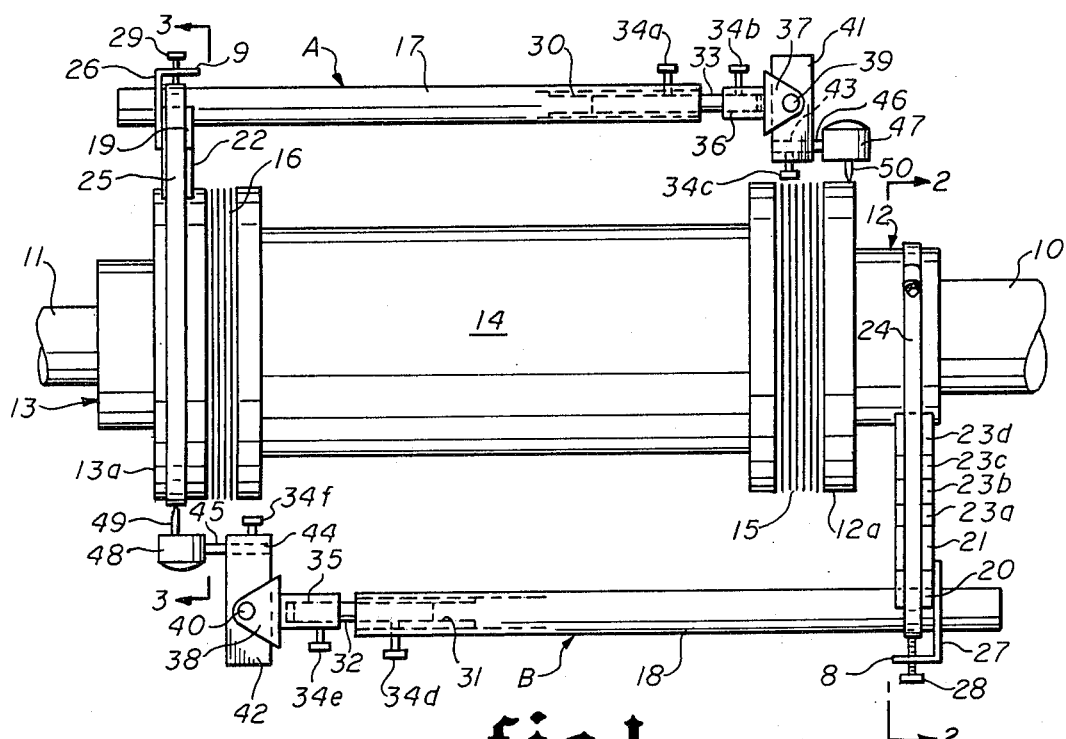
FIG. 1 is an elevational side view of a pair of fixtures attached to a pair of coupled shafts in a reverse indicator configuration for determining misalignment.

FIG. 1 shows a pair of fixtures both in accordance with the present invention arranged in the reverse indicator method of misalignment determination, wherein there is a flexible coupling 14 between two shafts 10 and 11 with exposed coupling hubs 12 and 13, respectively. Fixture A is mounted vertically above the center line of the axes extending through shafts 10 and 11 and coupling 14. The fixture is mounted by means of metal strap 25 which passes around the flanged portion 13a of coupling hub 13. An angle member 22, which is fixedly attached to block 19, for example, by welding, is seated on the flange 13a of coupling hub 13. The block 19 is attached for example, by welding, to plate 26 which has a portion 9 thereof extending laterally. The laterally extending arm 17 passes through block 19 beneath strap 25 and beneath plate 26 and is secured in place by thumb screw 29 extending threadedly through portion 9. Toward the distal end of lateral extending arm 17, is a channel or bore 30 which extends internally and into which tube 33 is seated and held in place by threadedly engaged thumb screw 34a. Mounted to the opposite end of tube 33 by means of channel or bore 36 and thumb screw 34b is holder 37. The laterally extending arm 17 extends along an axis generally parallel to the shaft 11.

Figure 14:
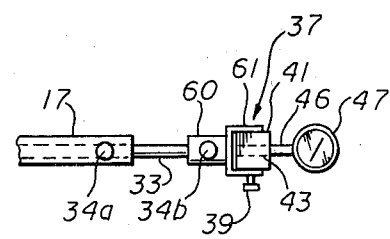
FIG. 14 is a top view of the holder for the dial indicator, mounted to a laterally extending arm.

Turning to FIG. 14, the holder can be seen in more detail to be comprised of a back portion 60 and a front portion 61 which forms a U shaped channel into which the slide block 41 is mounted. The dial indicator 47 is mounted to the slide block 41 by rod or tube 46 in bore 43 and secured therein by thumb screw 34c. Where possible, hollow tubing has been employed in the construction of the various components of the present invention to reduce the weight and hence the sag. Similarly, slide block 41 is hollow to the extent possible.

The slide block 41 is adjustably positioned by sliding in channel 61, and locked in place by means of the thumb screw 39 so as to bring the dial indicator 47 and the plunger thereon 50 into contact in this instance with the flanged portion 12a of coupling hub 12. The two coupling hubs 12 and 13 are attached to the coupling spacer 14 and spaced therefrom by flexible elements 15 and 16 respectively.

Figure 2:
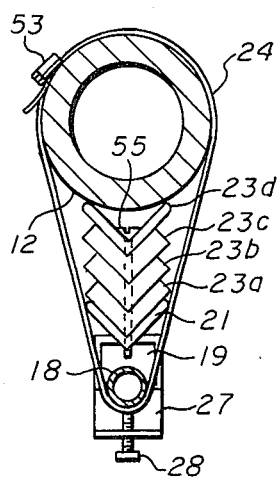
FIG. 2 is an end view taken along line 2—2 of FIG. 1 showing one embodiment of the fixture attachment.

At 180° opposed to Fixture A is Fixture B which is shown attached to the coupling hub 12 by means of metal strap 24 which passes over the hub and over the angle members 23a-d, angle component 21 and block 19 and over the laterally extending arm 18 and is held in place by thumb screw 28 passing through the laterally extending portion 8 of plate 27 onto which block 19 is attached. The angle members 23a-d are the same as component 21 and are superimposed, i.e., stacked, thereon. The angle member which faces and straddles the shaft with two legs can vary but is generally in the range of 90° to 150° included angle. The laterally extending arm 18 passes through block 20 and plate 27 in the same manner as that of fixture A. This particular embodiment demonstrates the utilization of the radial arm extended by modular units i.e., angle members 23a-d, which are shown in FIG. 2 to be attached to the fixedly mounted angular element 21 by means of a threaded screw 55 in a threaded hole (not shown) in angular element 21. In both fixtures A and B, the metal strap is affixed in place and tightened about the shaft (or the equivalent of the shaft, i.e., coupling flange or hub) by the worm gear band clamps 54 and 53 respectively.

A rod 32 projects into channel or bore 31 in rod 18 and is held there by thumb screw 34d. At the opposite end of the rod 32, holder 38 which is the duplicate of holder 37 of fixture A, is mounted onto the tube in channel or bore 35 on rod 32 and held in place by thumb screw 34e. A slide block 42 is slidably mounted in the holder and held in place by thumb screw 40. A dial indicator 48 having plunger 49 is mounted by means of rod or tube 45 into channel or bore 44 in slide block 42 and held in place by thumb screw 34f. In this embodiment the plunger 49 contacts the surface of the metal strap 25 which holds fixture A to the flanged portion 13b of coupling hub 13.

This is a particular advantage of the present invention which uses metal straps as the means for attaching a fixture and/or other component of the claimed system as opposed to any other means of attachment, such as roller chain. Metal straps form a flat surface which will correspond to the surface onto which it is attached, i.e., the hub, flanged portion of the hub, shaft or the like. Hence, the attachment of a fixture onto some portion of a shaft for alignment does not make that portion of the shaft unuseable for the reverse indicator extending from the other shaft.

Figure 4:
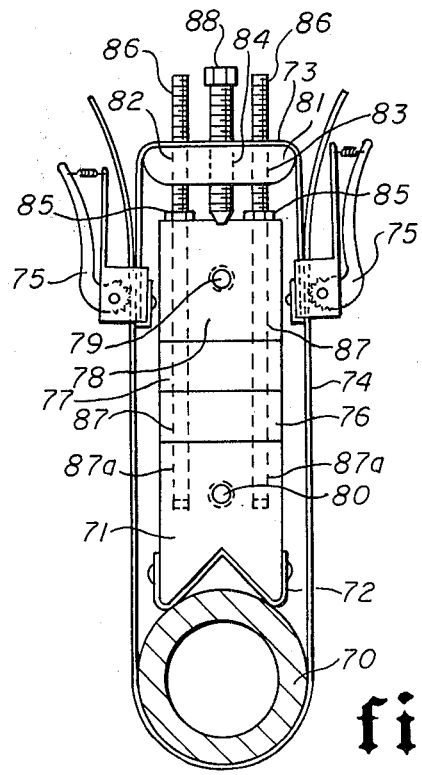
FIG. 4 is an end view of an alternate embodiment of fixture attachment.
Figure 3:
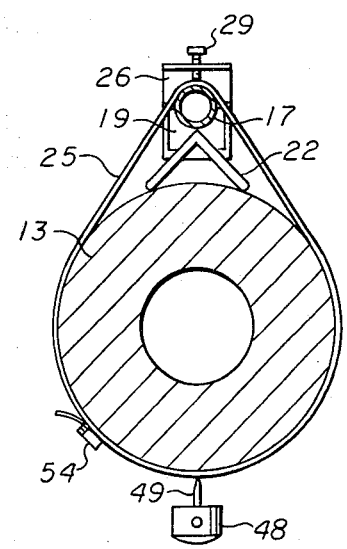
FIG. 3 is an end view along line 3—3 of FIG. 1 showing a modified embodiment of fixture attachment from that of FIG. 2.

In FIG. 4 alternate embodiment for attaching a fixture according to the present invention to a shaft is depicted. The shaft 70 is shown with a lower member 71 having an angular configuration for contacting the shaft and a replaceable brass facing 72 over the angular surface in contact with the shaft. In the embodiment shown, it is assumed that it was necessary to extend the radial component of the fixture by spacer blocks 76 and 77 and to employ the upper block 78 in order to clear some obstruction along the shaft, for example, a coupling hub or a shroud of some sort (not shown). In each of the lower radial 71 member and the upper radial 78 member, there are openings 80 and 79 respectively, which are used to attach a laterally extending arm as shown, for example, in FIGS. 11 or 13. The opening 80 in the lower radial member 71 would not be employed in the configuration shown in FIG. 4 since the modular extensions of the radial arm indicate that there is an obstruction or some reason to necessitate the radial extension, hence a laterally extending arm will attach at hole 79.

The metal strap 74 passes around the shaft and through the two serrated cam buckles 75 where it is gripped and held in place. The two buckles 75 are connected by metal strap 73 which passes over the head 81. The head 81 has three conduits or bores passing through it. Conduits 82 and 83 are unthreaded and conduit 84 is threaded. Threaded rods or studs 86 pass through holes (not shown) in strap 73 and through conduits 82 and 83 and into channels 87 which extend through the upper radial member 78, spacer blocks 76 and 77 and the lower radial member 71. The channel through the upper radial member and the spacer blocks is unthreaded and the channels 87 in the lower radial member 71 are threaded. The threaded rods 86 extend through the channel and are threaded into the threaded portion 87a of the channel 87 in the lower radial block member 71, and nuts 85 are drawn downwardly against the radial components to tighten the components together. Threaded bolt 88 passes through the threaded conduit 84 and strap 73 and is forced against the upper radial member 78 thereby drawing the slack out of the metal straps 73 and 74.

FIG. 5 shows the combination of a fixture and a fixture post according to the present invention. The fixture is that of FIG. 1, fixture B. In this instance, the fixture is attached to a shaft 92 by the metal band 24. Shaft 92 is connected through coupling hubs 90 and 91 and coupling spacer 89 which are in turn connected to shaft 93. In this embodiment, the dial indicator plunger 49 rests on the top of the fixture post C which is also shown in FIG. 6. The fixture post consists of a lower angle member 94 with the angle being seated onto the shaft 93 and held in place by metal band 96 which is attached to one leg of the lower angle member and passes through worm gear band clamp 97, which clamp is attached to the other leg of the lower angle member by metal band 95. Attached to the lower angle member 94, are two substantially parallel radial members 99 and 100. Attached between these two substantially parallel members is the upper radial member 98. The attachment of the upper radial member is made in a removable and adjustable fashion by means of screws 102 which pass through holes 101 in the substantially parallel radial members 99 and 100. The screws fit into appropriate screw holes (not shown) in the upper radial member 99 thereby allowing the height or the length of the radial extension of the fixture post to be adjusted according to need. Sight levels 103 and 104 are provided to obtain the appropriate positioning of the fixture posts on the shaft. By loosening the screws 102, it is also possible to adjust the upper radial member 98 along the axis of the shaft thus the fixture post is adjustable in four directions, i.e., vertically (perpendicular to the axis of the shaft), along the axis of the shaft, about the axis of the shaft, and about its vertical axis. The fixture post may be adjusted rotatably about its vertical axis by loosening nut 105 on bolt 107 (alternately a bolt engaged in a threaded insert in radial member 98 will serve the same purpose), rotating the upper radial member 98 about the axis of bolt 107 along the joint 106 and retightening nut 105.

Figure 7:
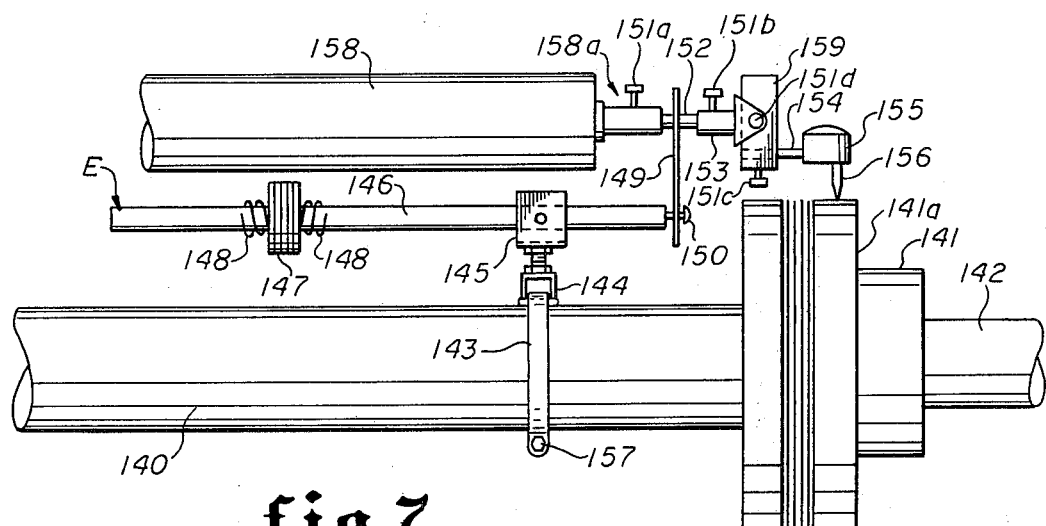
FIG. 7 is a partial side elevational view of a fixture in combination with a sag remover.

FIGS. 7 and 8 show alternative embodiments of sag removing apparatus used in conjunction with the fixture. A sag remover is utilized when the laterally extending arm is extended for a long distance and there is the likelihood of sag as described hereinabove, which will result in the useful area of the dial indicator being reduced because of the sag as discussed above.

FIG. 8 shows one embodiment wherein the sag remover D is mounted above the laterally extending arm 110 of the fixture. The laterally extending arm 110 is shown extending along a coupling spacer 119 which is coupled at 121 to shaft 120. A holder 113 is attached to the laterally extending arm 110 by tube 112 which is seated into bores (not shown). Tube 112 and the holder 113 are held in place by thumb screws 111a and 111b, respectively. A slide block 114 is mounted in the holder and affixed in place by thumb screw 111d. Extending laterally from the slide block on rod or tube 115 and held in place by thumb screw 111c is dial indicator 116 with plunger 117 contacting hub 109.

The sag remover D (See FIGS. 8 and 9) is mounted onto coupling spacer 119 by means of metal strap 118 which passes over a pair of parallel rods 128, which form the footings for the sag remover on the shaft, said rods 128 being attached to box tube 126 on two sides thereof at the lower and outer edges thereof, thereby said metal strap grips the base of the sag remover. Said box tube 126 is attached to a platform 124. Extending perpendicularly from platform 124, are a pair of substantially parallel upright members 123, which are attached to a second platform 125. Mounted to the second platform 125 is fulcrum 129 into which arm 130 is pivotally mounted on pivot 127. Arm 130 is connected to the laterally extending arm by means of link 131 which is loosely attached to the arm 130 by pin 132 and attached to the laterally extending arm 110 by tube 112 passing through the link 131. Mounted to arm 130 are weights 133 which are slidably seated on 130 and which are held in place by spring clamps 134. This allows an adjustment of the moment in order to remove the sag from the laterally extending arm 110 of the fixture by adjusting the weight position, hence the moment arm. Normally when any sag remover is employed it is first calibrated on a horizontal pipe in the shop for a particular radius, length and type of laterally extending arm and dial indicator and then easily set up in the field using the prior calibration to remove the sag. The sag remover D is attached to the coupling spacer by means of metal strap 118 which passes over the rods 128 and is secured against the calibration pipe or coupling spacer by the operation of worm screw band clamp 122.

FIG. 7 shows a sag remover which is positioned below the laterally extending arm of the fixture. The sag remover E is mounted to the coupling spacer 140 by means of metal strap 143 through a footing arrangement as shown for the sag remover D in FIG. 8. The apparatus is tightened onto the coupling spacer by use of worm screw belt clamp 157. Attached to the footing 144 is fulcrum 145 in which arm 146 is pivotally mounted. Weights 147 are slidably mounted on the arm 146 toward one end thereof and held in place by spring clamps 148. At the opposite end past the pivot in the fulcrum, the arm 146 is attached to a link 149 by pin 150. The link in turn is attached to tube 152 which is a component of the laterally extending arm 158 of the fixture (the fixture having been attached at a point not shown to the left of the drawing). The tube 152 is attached to the lateral extension arm 158a by means of a bore or channel in the arm and a thumb screw 151a which is tightened onto tube 152. The tube 152 extends through the link 149 and is similarly seated into a holder 153 and held therein by thumb screw 151b. The holder holds slide block 159 which is adjustably seated in the holder and held in place by thumb screw 151d. The slide block has mounted into it the dial indicator 155 by means of rod or tube 154 which is releasably seated into the slide block 159 and held there by thumb screw 151c. The plunger 156 contacts the flange 141a of coupling hub 141, attached to shaft 142.

Figure 10:
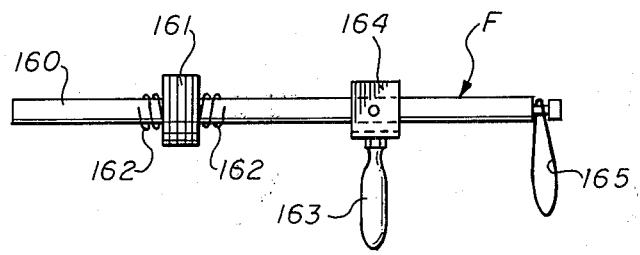
FIG. 10 is a side elevation of a hand held sag remover.

In FIG. 10 a hand held sag remover (F) is depicted. It is not always possible because of space limitations to fit either of the two fixedly mounted sag removers (D or E) previously described onto the coupling spacer. Also, at times only one shaft can be rotated, thus necessitating coupling spacer removal, hence deleting the mounting surface which is required by a fixedly mounted sag remover of the D or E type. In such event, it is possible to overcome the sag by use of the hand held sag remover which is provided with a handle 163 on which a fulcrum 164 is mounted with the arm 160 pivotally mounted in the fulcrum and having at one end thereof weights 161 which are slidably positionable along the arm 160 and held at the located position by spring clamps 162. At the opposite end from said weights and past the fulcrum, is a silk thread loop 165 which is placed near the dial indicator, over some portion of the extreme free end of the laterally extending arm of a mounted fixture, (not shown). The silk thread (or other types of flexible materials could also be used) allows the sag remover to be held to the side of the shaft because the thread is flexible. Substantially the same result is obtained with a hand held sag remover as is obtained with the rigidly mounted sag remover, after some amount of practice.

Figure 11:
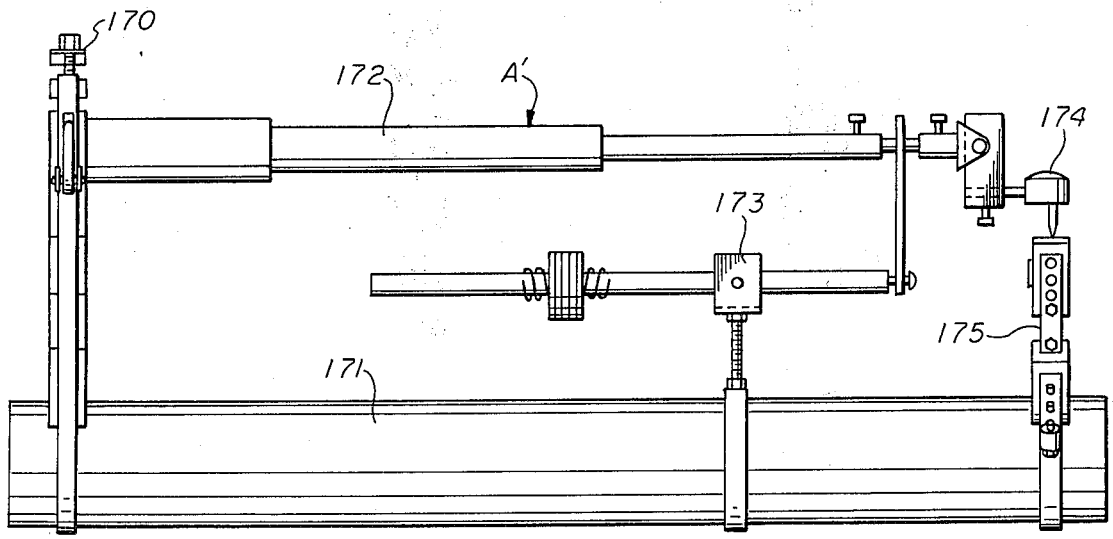
FIG. 11 is a side elevation of a fixture in combination with a fixture post and sag remover, mounted for calibration.
Figure 12:
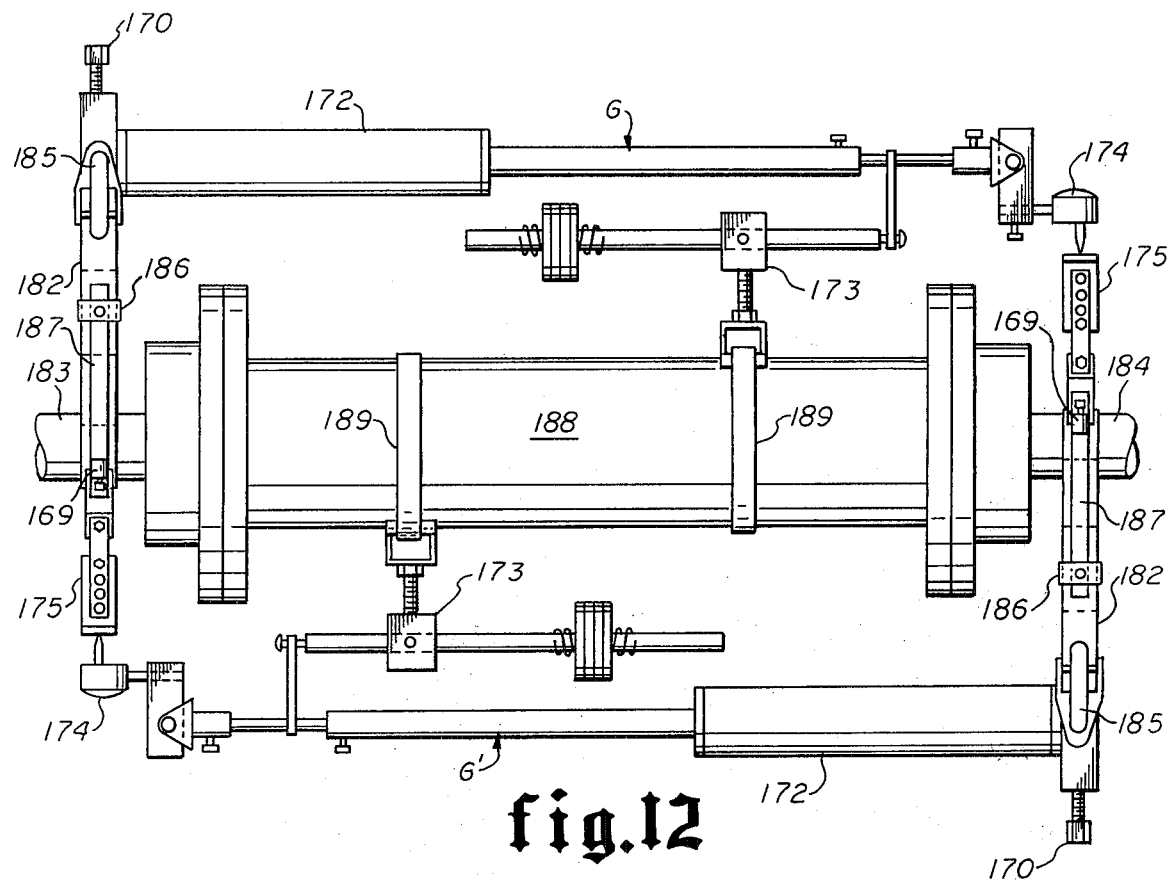
FIG. 12 is a side elevation of a pair of fixtures in combination with a pair of fixture posts and a pair of sag removers attached to a shaft having a gear coupling.

FIGS. 11 and 12 are to be considered together. In FIG. 11, the combination of a fixture, fixture post and sag remover all in operable association to form a system is depicted. The radial arm 170 of the fixture A is that disclosed in FIG. 4. The laterally extending arm 172 is composed of attached thin walled tubing and is a configuration particularly desirable for extremely long spans. The dial indicator 174 at the extreme or distal end of the laterally extending arm rests on fixture post 175 which has been described in detail in regard to FIG. 6 and the sag remover 173 is that described in its components and its relationship to the laterally extending arm of the fixture in FIG. 7.

It should be noted that the components are all three attached to a shaft 171. In this instance, the shaft does not show a coupling, and this is the configuration which would be found in a shop where the calibration of the sag and the adjustment of the sag remover to compensate this is predetermined prior to carrying this apparatus out for use in the field. In other words, the shaft 171 is a piece of pipe.

Turning to FIG. 12, a field set-up of a reverse indicator type of misalignment determination is depicted. Normally in use in the field for determining misalignment and for aligning shafts, there will be two systems either comprised of the fixture, fixture and fixture post or fixture, fixture post and sag remover arranged onto the shafts to be aligned at 180° from each other. This illustration, of course, varies from that of FIG. 11 in that there is a coupling 188 present here. In addition, since there are two complete systems, the attachment of the radial arm of the fixture on one side of the shaft has been attached for the purposes of securing it to the shaft, at the same axial position as the radial fixture post extending at an angle of 180° therefrom in the opposite direction of the shaft. This is the most axially compact way of making the installation, and is often necessitated by limited exposed shaft length.

The fixtures G and G' are duplicates and are attached to shafts 183 and 184, respectively by radial arm 170 and radial fixture post 175 is attached at 180° to the radial arm 170 onto said shafts 183 and 184, respectively. The radial arm 170 is secured by means of a metal strap 182, extending about shaft 183 (or 184, respectively) to serrated cam buckle 185 on radial arm 170 wherein it is releasably grasped (See FIG. 4 for details). The radial fixture post 175 is secured by metal strap 187 to metal strap 182 by screw lock buckle 186. Said strap 187 is made adjustable by worm gear assembly 169 which attaches strap 187 to fixture post 175. It should be appreciated that for the purposes of installation and use of the apparatus as depicted in FIG. 12, the attachment means, i.e., metal straps, cam buckle, lock buckle and worm gear assembly is duplicated on the opposite side of the apparatus (not shown). Extending laterally along the axis of the shaft and over the coupling spacer 188 is a laterally extending arm 172, which extends to a point to place dial indicator 174 in a position to contact radial fixture post 175. Sag remover 173 as previously described, is located between the shaft and the fixture as shown in FIG. 7 embodiment, with the sag remover being attached to coupling spacer 188 by an adjustable metal band 189.

Utilization of the reverse indicators to illustrate the present invention is in the usually conventional manner in which they are currently and have previously been used in the art. It, of course, should be appreciated that the rim and face method of alignment can and has been employed by the present disclosed and claimed apparatus, although there is no specific depiction thereof. Those of ordinary skill in the art will readily appreciate that the adjustable features of the holder and the slide block readily accommodate the present apparatus to the face and rim method of alignment, with minor variations in accessories.

Figure 13:
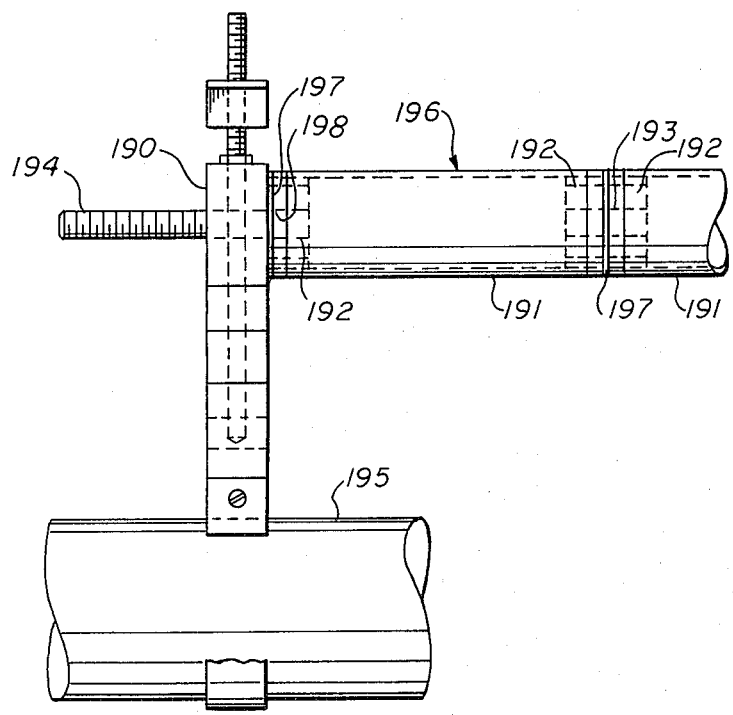
FIG. 13 is an enlarged detail partial cross sectional elevation of the coupling of modular units of one embodiment of laterally extending arm of the fixture.

Turning now to FIG. 13, details as to the manner of construction of one embodiment of a laterally extending fixture arm are disclosed.

In this embodiment, a radial fixture arm 190 such as that shown in FIG. 4 is attached to a shaft 195. The laterally extending arm 196 is built up out of modular sections of thin walled tubing, for example, aluminum tubing or graphite fiber reenforced epoxy made into tubing. A cap 192 is inserted at the end of each modular tubular unit, for example, aluminum end caps are inserted into the tube sections and secured with an adhesive such as epoxy. The end caps 192 have threaded inserts along their central axis which allows hollow threaded connectors 193 to join two adjacent sections 191 together usually by being threaded into the end caps. Usually a thin non-metallic washer 197 is inserted between the two modular sections, to prevent galling. Suitable washers have been found to be polytetrafluoroethylene impregnated fiber glass. The laterally extending arm 196 is attached to the radially extending arm 190 of the fixture by means of a similar threaded connector entering into the threaded opening in the end cap adjacent to the radial arm 190 (see FIG. 4 where openings 79 and 80 are shown, both of which are threaded openings into which the connecting means is threaded to attach the lateral arm).

Alternatively a threaded rod 198 may be inserted into the end cap 192 and extended through the threaded opening in the radial arm 190 to produce the extension 194. This embodiment allows a symmetrical or pendant counterweight to be applied to neutralize the deflection of the radial arm. However, this is not a requirement and in some configurations or utilizations, there would not be space available to have the option of this feature.

The invention claimed is:

1. An alignment apparatus system comprising in combination:

an alignment fixture comprising a modular radial arm adapted to seat on a first shaft to be aligned, said radial arm being extendable by modular units, an arm extending laterally from said radial arm and axially in regard to said first shaft to be aligned, a metal strap associated with said radial arm for attaching said radial arm to said first shaft and means located along said metal strap to fasten and adjust said metal strap, a holder connected to said laterally extending arm distal to said radial arm and having a channel therein, and a block for positioning a dial indicator, said block being adjustably mounted in said channel, said dial indicator having a plunger actuated hand for making readings, and an adjustable fixture post comprising a first block adapted to seat on a second shaft to be aligned and extend radially therefrom; a pair of metal straps attached to said first block for attaching said first block to said second shaft and means located along said metal straps to fasten and adjust said straps, a pair of substantially parallel members mounted to said block and extending radially therefrom, a second block repositionably mounted between said substantially parallel members for repositioning said second block at various distances from said first block, said second block providing a contact surface for said plunger of the dial indicator.

2. An alignment apparatus system comprising in combination:

an alignment fixture comprising a modular radial arm adapted to seat on a first shaft to be aligned, said radial arm being extendable by modular units, an arm extending laterally from said radial arm and axially in regard to said first shaft to be aligned, a metal strap associated with said radial arm for attaching said radial arm to said first shaft and means located along said metal strap to fasten and adjust said metal strap, a holder connected to said laterally extending arm, distal to said radial arm and having a channel therein, and a block for positioning a dial indicator, said block being adjustably mounted in said channel, said dial indicator having a plunger actuated hand for making readings, and a sag remover comprising, a base, a fulcrum, an arm pivotally mounted through said fulcrum, means for attaching one end of said arm to the laterally extending arm of said alignment fixture and weighting means slidably mounted on said arm past said fulcrum on the end of the rod opposite to said means for attaching to said laterally extending arm.

3. An alignment apparatus system comprising in combination:

an alignment fixture comprising a modular radial arm adapted to seat on a first shaft to be aligned, said radial arm being extendable by modular units, an arm extending laterally from said radial arm and axially in regard to said first shaft to be aligned, a metal strap associated with said radial arm for attaching said radial arm to said first shaft and means located along said metal strap to fasten and adjust said metal strap, a holder connected to said laterally extending arm distal to said radial arm and having a channel therein, and a block for positioning a dial indicator, said block being adjustably mounted in said channel, said dial indicator having a plunger actuated hand for making readings, an adjustable fixture post comprising a first block adapted to seat on a second shaft to be aligned and extend radially therefrom; a pair of metal straps attached to said first block for attaching said first block to said second shaft and means located along said metal straps to fasten and adjust said straps, a pair of substantially parallel members mounted to said block and extending radially therefrom, a second block repositionably mounted between said substantially parallel members for repositioning said second block at various distances from said first block, said second block providing a contact surface for said plunger of the dial indicator, and a sag remover comprising, a base, a fulcrum, an arm pivotally mounted through said fulcrum, means for attaching one end of said arm to the laterally extending arm of said alignment fixture and weighting means slidably mounted on said arm past said fulcrum on the end of the rod opposite to said means for attaching to said laterally extending arm.

4. The alignment apparatus system according to claim 2 or 3, wherein said radial arm of said alignment fixture comprises a first angular member wherein the legs of the member straddle and contact the shaft.

5. The alignment apparatus system according to claim 4 wherein said radial arm of said alignment fixture is extendable by stacked angular members.

6. The alignment apparatus system according to claim 5 wherein said angular members are attached together.

7. The alignment apparatus system according to claim 2 or 3, wherein said radial arm of said alignment fixture is extendable by blocks joined to said first angular member.

8. The alignment apparatus system according to claim 2 or 3, wherein said laterally extending arm of said alignment fixture comprises joined sections.

9. The alignment apparatus system according to claim 2 or 3, wherein said holder is extendably mounted to said laterally extending arm of said alignment fixture by a rod movably mounted in a bore in said arm.

10. The alignment apparatus system according to claim 3, wherein said first block of said adjustable fixture post has an angular configuration wherein said legs of the angle straddle and contact the shaft.

11. The alignment apparatus system according to claim 10 wherein said adjustable fixture post has sight levels incorporated therein.

12. The alignment apparatus system according to claim 2 or 3 wherein said base of said sag remover comprises a rod.

13. The alignment apparatus system according to claim 12 wherein said rod of said sag remover is handle for holding the sag remover manually.

14. The alignment apparatus system according to claim 3 wherein said base of said sag remover comprises a footing for resting against a shaft, said footing having means for receiving a metal strap therethrough for attaching said sag remover to said shaft.

15. The alignment apparatus system according to claim 2 or 3 wherein said means for attaching said sag remover to the laterally extending arm of an alignment fixture comprises a rigid link.

16. The alignment apparatus system according to claim 2 or 3 wherein said means for said sag remover attaching to the laterally extending arm of an alignment fixture comprises a flexible member.

17. The alignment apparatus system according to claim 16 wherein said flexible member of said sag remover is a thread.

18. The alignment apparatus system according to claim 1 wherein said first block of said adjustable fixture post has an angular configuration wherein said legs of the angle straddle and contact the shaft.

19. The alignment apparatus system according to claim 18 wherein said adjustable fixture post has sight levels incorporated therein.

20. The alignment apparatus system according to claim 1 wherein said radial arm of said alignment fixture comprises a first angle number wherein the legs of the member straddle and contact the shaft.

21. The alignment apparatus system according to claim 20 wherein said radial arm of said alignment fixture is extendable by stacked angular members.

22. The alignment apparatus system according to claim 21 wherein said angular members are attached together.

23. The alignment apparatus system according to claim 1 wherein said radial arm of said alignment fixture is extendable by blocks joined to said first angular member.

24. The alignment apparatus system according to claim 1 wherein said laterally extending arm of said alignment fixture comprises joined sections.

25. The alignment apparatus system according to claim 1 wherein said holder is extendably mounted to said laterally extending arm of said alignment fixture by a rod movably mounted in a bore in said arm.

26. The alignment apparatus system according to either claims 22 wherein said sag remover has means for attaching to a shaft or element associated with a shaft comprising a metal strap passing through a portion of said sag remover and means located along said metal strap for fastening and adjusting said strap.

* * * * *

UNITED STATES PATENT AND TRADEMARK OFFICE
CERTIFICATE OF CORRECTION

PATENT NO. : 4,367,594

DATED : January 11, 1983

INVENTOR(S) : Malcolm G. Murray

It is certified that error appears in the above—identified patent and that said Letters Patent is hereby corrected as shown below:

On the title page under "Other Publications"
  right column, line 1, reads "Mung, J. Reprint from Hydrocarbon, Jan. 1979"
  but should read---Murray, Jr. Reprint from Hydrocarbon Processing, Jan.1979---
  Column 4, line 40, reads "attached to a shaft"
  but should read
  ---attached to shafts---

Column 8, line 57, reads "fixture A"
  but should read---fixture A'---

Claim 20, line 3, reads "comprises a first angle number"
  but should read---comprises a first angle member---
  Claim 26, line 2, reads "either claims 22"
  but should read ---either claim 2 or 3---

Signed and Sealed this

Seventh Day of June 1983

[SEAL]

Attest:

DONALD J. QUIGG

Attesting Officer

Acting Commissioner of Patents and Trademarks